US007111816B1

(12) United States Patent
Goodman

(10) Patent No.: US 7,111,816 B1
(45) Date of Patent: Sep. 26, 2006

(54) MOLD FOR INTEGRATED MOLD AND CASTING STRUCTURES

(76) Inventor: Richard J. Goodman, 5101 Jordan Grove, West Des Moines, IA (US) 50265

(*) Notice: Subject to any disclaimer, the term of this patent is extended or adjusted under 35 U.S.C. 154(b) by 0 days.

(21) Appl. No.: 10/346,529

(22) Filed: Jan. 17, 2003

(51) Int. Cl.
*B29C 39/00* (2006.01)

(52) U.S. Cl. ............................... 249/134; 425/DIG. 58

(58) Field of Classification Search .................. 249/83, 249/117, 134; 425/DIG. 58; 264/318
See application file for complete search history.

(56) References Cited

U.S. PATENT DOCUMENTS 1,911,720 A * 5/1933 Sherman ..................... 249/103
2,037,545 A * 4/1936 Sexton ........................ 249/83
4,213,238 A * 7/1980 Gudorf ........................ 29/878
4,905,752 A 3/1990 Rama Prasad
5,232,718 A 8/1993 Miyazawa et al.
5,287,989 A 2/1994 Luther
5,293,923 A 3/1994 Alabi
5,415,537 A * 5/1995 Ishikawa .................... 425/130
5,974,610 A 11/1999 Johnson et al.
6,039,558 A 3/2000 Park et al.
6,082,151 A 7/2000 Wierzba et al.
6,364,654 B1 4/2002 Luther
6,403,003 B1 * 6/2002 Fekete et al. ............... 264/129
2003/0057096 A1 * 3/2003 Morales et al. ............... 205/67

* cited by examiner

*Primary Examiner*—Donald Heckenberg
(74) *Attorney, Agent, or Firm*—G. Brian Pingel; Camille L. Urban; Adam W. Jones

(57) ABSTRACT

The mold that is intended to be used integrally with casting material that is contemplated by this invention is formed with a surface that exerts pressure on and retains set casting material in the mold by providing a pin in the mold that has an upper region that is larger in a dimension perpendicular to the base of the mold than the base of the pin.

8 Claims, 1 Drawing Sheet

MOLD FOR INTEGRATED MOLD AND CASTING STRUCTURES

BACKGROUND OF THE INVENTION

1. Field of the Invention

This invention relates to the art of mold manufacturing and specifically to the manufacturing of molds that are to be used integrally with the casting material with which they are filled.

2. Description of the Prior Art

The manufacture of molds for the purpose of casting is a well known technology. Most commonly, a mold is used to form a casting material, such as metal, concrete, or plastic into a specified shape. The casting material is introduced into the mold in a fluid form and is allowed to set, thereby assuming the shape of the mold.

In most instances, a mold is a tool for forming casting material into a predetermined shape that is separated from the set casting material and either discarded or used again. For this reason, molds commonly are concave. This shape facilitates separation of the mold from the casting material.

In certain instances, however, the mold and the casting material are intended to be used integrally. In this instance, a concave mold may have shortcomings. The mold and the casting material may separate unintentionally, frustrating the performance of the integrated mold and casting material.

It is therefore desirable, in instances where the mold and the casting material are to be used integrally, to have a mold with at least one surface which exerts pressure on the set casting material such that the set casting material remains biased into the mold.

It is also often desirable to have the mold made of the least expensive, substantially rigid material available. Commonly, the material that is best suited for this purpose is plastic. Plastic is usually formed by injection molding, which is also a well known art. Injection molding requires a mold into which fluid hot thermoplastic is injected. After a suitable cooling period, the plastic is then removed from the exterior mold. Such injection molding is used to produce plastic structures that are concave on one surface and convex on the opposite surface. This is so because injection molding generally requires an injectible mold formed of two movable plates. The first of these plates has a concave portion, the second of these plates has a slightly smaller convex portion that fits approximately into the concave portion of the first plate. The two portions are separated by a gap that defines the injectible mold. The first and second plates are concave and convex, respectively, because the resulting plastic must separate easily from the plates. No current technology exists that provides for an injection molded plastic mold created from a single piece that has a surface that would retain set casting material within the mold.

SUMMARY OF THE INVENTION

The mold that is intended to be used integrally with casting material that is contemplated by this invention could be of any general shape. Such a mold, if it is produced by injection molding, must be concave so that the mold may be extracted from the injectible mold by which it is produced. The mold of this invention is formed with a surface that exerts pressure on set casting material to remain in the mold by providing a pin in the mold that has an upper region that is larger in a dimension perpendicular to the base of the mold than the base of the pin.

It is therefore an object of this invention to provide a mold having a structure within it that retains set casting material within the mold. It is a further objection of this invention to provide such a structure through injection molding.

It is yet another object of this invention to provide a mold which contains such a structure that is frustoconical in shape.

These and other objects of the invention will be apparent to those skilled in the art.

DESCRIPTION OF THE PREFERRED EMBODIMENT

Figure 1:
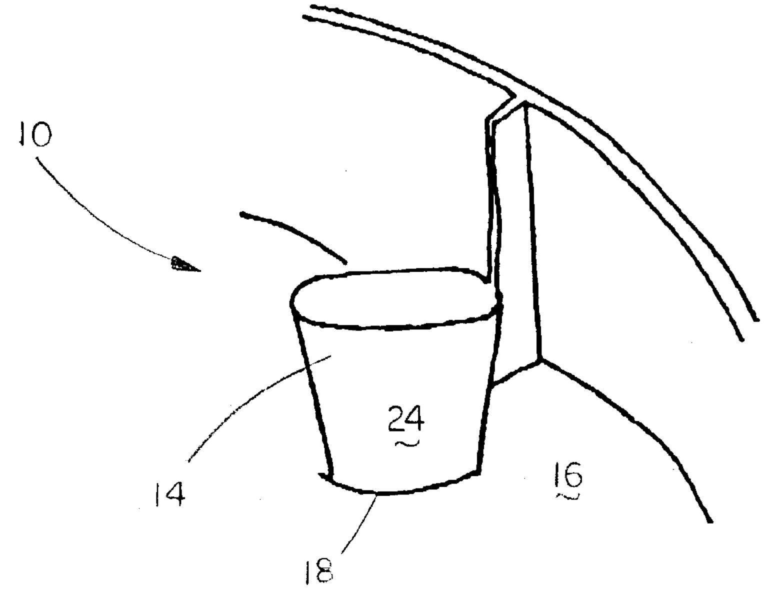
FIG. 1 is a partial perspective view of the mold.
Figure 2:
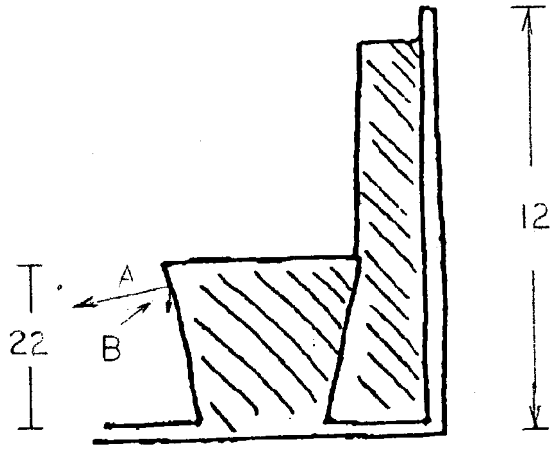
FIG. 2. is a cross sectional view of the mold.
Figure 3:
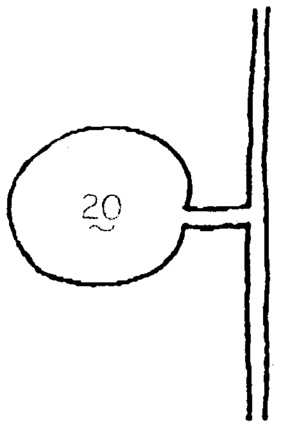
FIG. 3 is a top view of the mold.

The mold 10 of this invention may be formed by injection molding. It may be of any general shape, but, for purposes of formation by injection molding, will be substantially concave. The concave portion of the mold 10 defines a reservoir having a height 22.

The mold 10 is formed with a pin 14 extending upwardly from its base 16. The pin 14 on the finished mold 10 will have a base portion 18, an upper portion 20, and a height 12. The upper portion 20 of the pin 14 will be larger in a dimension perpendicular to the base 16 of the mold 10 than the base portion 18 of the pin 14. The pin 14 will have a surface 24 extending between the upper portion 20 and the base portion 18 of the pin 14. Ideally, the pin 14 will be frustoconical in shape.

By virtue of the fact that the upper portion 20 is larger than the base portion 18 of the pin 14, the surface 24 will be disposed at an angle to the base 16 that is less than ninety degrees. This means that vector A representing the pressure that would be exerted on casting fluid within the reservoir would have a downward component B that would tend to retain set casting fluid in the mold 10.

The pin 14 may extend beyond the height of the reservoir 22 or be of a height less than the height of the reservoir 22, as shown. If the pin extends upwardly beyond the height of the reservoir 22, it is important to have a portion of the surface 24 that is disposed at an angle to the base 16 that is less than ninety degrees located below that height. In such a structure, it would be common for the casting material to be introduced to the mold 10 only to the height of the reservoir 22. The pin 10 would not exert downward pressure on the set casting material unless that portion of the surface 24 that is disposed at an angle to the base 16 that is less than ninety degrees is in contact with the casting material.

The pin 14 as shown in the figures could not be formed by traditional injection molding. Nontraditional methods may be used, however, to obtain a pin of the desired shape. One method of forming such a pin 14 is to remove the mold 10 from an injection molding machine (injection molding machines are well known in the art and not shown) in which it is formed. The pin 14 may be formed in a right cylindrical shape, either hollow or solid, so that the mold can be extracted from the injection molding machine. A right cylindrical shape would have no downward component B in a pressure vector A extending from its surface. One method of forming such a pin 14 is to remove the mold 10 from the injection molding machine in which it is formed while the plastic is still pliable. When the mold 10 is being extracted from the injection molding machine, but while the thermoplastic fluid is still pliable, downward pressure can be exerted on the upper portion 20 of the pin 14. Because the thermoplastic will be pliable, the right cylindrical pins will expand outwardly under the downward pressure. If allowed to set in this shape, the mold 10, when set will include a pin 14 having a shape generally as shown in the figures.

The pin 14 may be largely two-dimensional in shape. In this instance, a flat pin (not shown) could be formed in a fan shape such that its upper edge is wider than its base. This structure, too, would exert downward pressure on the casting material along the edge between the upper edge and the base.

It is possible to provide such a structure in a mold form by methods other than injection molding. Pins having a frustoconical could be affixed to the base of a mold 10 with adhesives, by mechanical connection, or by other means well known in the art.

The shape of the pin 14 is not limited to those previously described, but may be of any shape being larger at its upper end that at its lower end. Thus it can be seen that the objects of the invention have been met.

I claim:

1. A mold that is unitarily formed of a rigid material to be used in producing an integrated mold and casting structure, said mold comprising:

a) a reservoir with a base, said reservoir being adapted to hold said casting fluid to a predetermined depth as the fluid sets to produce said casting structure;

b) a rigid pin unitarily formed with and extending upwardly from said base into said reservoir, said pin having a lower end, an upper end, and a surface extending therebetween, said surface of said pin has less than a 90 degree angle to said base;

c) said upper end of said pin having a width greater than said lower end of said pin; and d) said surface extending at least partially below said predetermined depth and being adapted to exert on said casting fluid upon setting downward pressure toward said base of said mold to permanently retain said set casting fluid in said mold.

2. The mold of claim 1 wherein said pin is of frustoconical shape.

3. The mold of claim 1 wherein the mold is formed by injection molding.

4. The mold of claim 1 wherein said rigid material is plastic.

5. The mold of claim 1 wherein said casting fluid is concrete.

6. A one piece mold to be used in forming an integrated mold and casting structure comprising:

a) a reservoir having a base and adapted to hold a casting fluid to a predetermined depth as said fluid sets to produce said casting structure;

b) a rigid pin extending upwardly from said base into said reservoir, said pin having a lower end, an upper end, and a surface extending therebetween;

c) said upper end of said pin having a width greater than said lower end of said pin;

d) said pin is of a frustoconical shape; and e) said surface extending at least partially below said predetermined depth and being adapted to exert downward pressure on said casting fluid upon setting to urge said set fluid toward said base of said mold to permanently retain said set fluid in said mold;

f) said one piece mold is formed of a plastic sufficiently rigid to retain said set fluid in said mold.

7. The mold of claim 6 wherein the mold is formed by injection molding.

8. The mold of claim 6 wherein said casting fluid is concrete.

* * * * *